United States Patent [19]

Yagi et al.

[11] Patent Number: 4,650,856

[45] Date of Patent: Mar. 17, 1987

[54] PROCESS FOR PRODUCING GLUTEN HAVING HIGH SOLUBILITY

[75] Inventors: Naoki Yagi, Suita; Kwang Y. Kim, Osaka; Tarushige Nakaji, Yao, all of Japan

[73] Assignee: Minaminihon Rakuno Kyodo Kabushiki Kaisha, Miyazaki, Japan

[21] Appl. No.: 732,275

[22] Filed: May 9, 1985

[30] Foreign Application Priority Data

May 17, 1984 [JP] Japan .................................. 59-100083

[51] Int. Cl.$^4$ .............................................. A23J 1/12
[52] U.S. Cl. ....................................... 530/363; 435/68; 435/69; 435/206; 435/272; 530/362; 530/365; 530/367; 530/374; 530/380; 530/386; 426/656
[58] Field of Search ............... 260/112 G, 112 B, 121; 435/68, 69, 272, 206; 530/363, 365, 367, 362, 380, 386, 386, 374; 426/656

[56] References Cited

U.S. PATENT DOCUMENTS

| | | | |
|---|---|---|---|
| 3,542,754 | 11/1970 | Fellers | 260/112 G |
| 3,782,964 | 1/1974 | Knight | 260/112 G X |
| 4,100,151 | 7/1978 | Adler-Nissen | 260/112 G |
| 4,217,414 | 8/1980 | Walon | 435/272 X |
| 4,282,319 | 8/1981 | Conrad | 435/69 |
| 4,478,856 | 10/1984 | Adler-Nissen et al. | 435/68 X |

OTHER PUBLICATIONS

Chem. Abstracts, 31 (1937), 7448$^9$–7449$^{1-2}$, Yurgenson.
Chem. Abstracts, 32 (1938), 9307$^{6-8}$, Harris.
Windholz, The Merck Index, 1976, pp. 733–734.
Haurowitz, The Chemistry and Function of Proteins, Second Edition, 1963, p. 201.

*Primary Examiner*—Howard E. Schain
*Attorney, Agent, or Firm*—Wegner & Bretschneider

[57] ABSTRACT

A process for producing gluten having high solubility which comprises heating an aqueous acidic solution of gluten and one or more proteins selected from the group consisting of albumins and globulins in an amount of one half or less of that of gluten under acidic conditions and then, after cooling, neutralizing the solution, if necessary.

4 Claims, 3 Drawing Figures

PROCESS FOR PRODUCING GLUTEN HAVING HIGH SOLUBILITY

FIELD OF THE INVENTION

The present invention relates to a process for producing gluten having high solubility, more particularly, having excellent water solubility even at a neutral pH range. The gluten product obtained by the process of the present invention can be used as main or supplementary raw materials for various food products.

BACKGROUND OF THE INVENTION

Gluten is a vegetable protein having various functions such as dough forming ability, gelation properties with heating and the like, and is widely utilized as main or supplementary raw materials of various food products such as bread, pasta, noodles, fish paste, sausage and the like. However, gluten is insoluble in water at a neutral pH range, while it shows good solubility in water at an acidic pH range. Therefore, utilization of gluten in food products is much limited in this respect.

In order to improve solubility of gluten, various processes such as deamidation [N. Matsutomi et al., J. Agr. Chem. Soc. Jpn., 50, 983 (1981)], chemical modification of side chains [D. R. Grant, Cereal Chem., 50, 417 (1973)] and the like have been hitherto proposed. However, these conventional processes are not suitable for practical use. For example, in deamidation, gluten having sufficient solubility can not be obtained unless a treatment at a high temperature for a long period of time under a very high acid concentration is performed. In case of chemical modification of side chains, much more time and labor are required until safety of the chemical modification is confirmed and the modified product is allowed as a food. Thus, the conventional processes can hardly be employed in practice.

Under these circumstances, in order to find out a practical process for producing gluten having high solubility even at a neutral pH range, the present inventors have intensively studied. As the result, it has been found that solubility of gluten even at a neutral pH range is remarkably improved by heating gluten in an aqueous acidic solution in the presence of another certain protein and then neutralizing the solution after cooling.

OBJECTS AND SUMMARY OF THE INVENTION

The main object of the present invention is to provide a process for producing gluten having high water solubility even at neutral pH range.

This object as well as other objects and advantages of the present invention will become apparent to those skilled in the art from the following description and the accompanying drawings.

According to the present invention, there is provided a process for producing gluten having high solubility which comprises heating an aqueous acidic solution of gluten and one or more proteins selected from the group consisting of albumins and globulins in an amount of one half or less of that of gluten under acidic conditions, and then neutralizing the solution, if necessary, after cooling. The heating conditions and acidic conditions in the present invention are much milder than those in conventional deamidation. In addition, the treatment of the present invention does not raise any specific problem in utilization of the resultant product in foods. Thus, according to the present invention, gluten having high water solubility can be obtained practically.

DETAILED DESCRIPTION OF THE INVENTION

Figure 1:
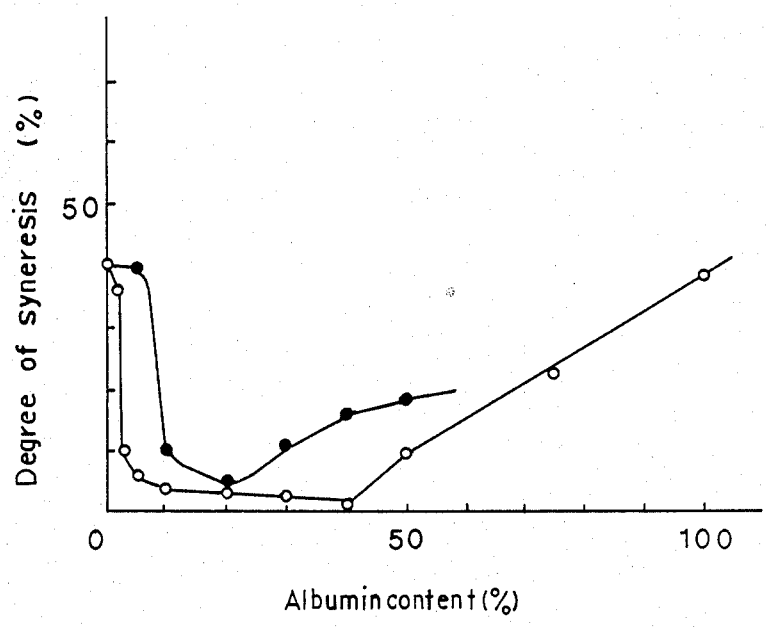
FIG. 1 is a graph illustrating a relation between an amount of albumin added and a degree of syneresis.

In order to produce gluten having high solubility by the process of the present invention, firstly, an aqueous acidic solution comprising gluten and one or more proteins selected from the group consisting of albumins and globulins is prepared.

Gluten to be used is not limited to a specific one and there can be used any commercially available gluten products such as powdered gluten, hydrous gluten, etc.

Examples of the protein selected from the group consisting of albumins and globulins include $\alpha$-lactalbumin, ovalbumin, serum albumin, myogen, $\beta$-lactoglobulin, serum globulin, lysozyme, myosin and the like. They can be used alone or in a combination thereof. These proteins are used in an amount of one half or less of that of gluten used. Preferably, when $\alpha$-lactalbumin, serum albumin, $\beta$-lactoglobulin, serum globulin or a combination thereof is used, the amount of the protein or the combination of the proteins is 3 to 50 parts by weight per 100 parts by weight of gluten. When ovalbumin, myogen, lysozyme, myosin or a combination thereof, or a combination thereof and the above other proteins is used, the amount of the protein or the combination of the proteins is 10 to 30 parts by weight per 100 parts by weight of gluten.

The aqueous acidic solution can be prepared, for example, by dissolving gluten in an aqueous acid solution at a pH of about 4 or lower and then adding the above other protein or combination thereof to the solution to dissolve it; or by preparing an aqueous solution of the above other protein or combination thereof and then dissolving gluten in the solution at a pH of about 4 or lower. The amount of gluten in the solution can be appropriately chosen but, usually, it is about 40% by weight or lower. Further, examples of the acid to be used include hydrochloric acid, acetic acid, phosphoric acid, lactic acid, citric acid, tartaric acid, etc.

Then, the resulting aqueous acidic gluten solution is subjected to a heat treatment.

When ovalbumin, myogen, lysozyme, myosin or a combination thereof is used, it is desirable that the solution is adjusted to a pH of 2.5 to 3.5 and subjected to a heat treatment at 50° to 80° C. for up to 30 minutes, preferably, for up to 15 minutes. Other than these cases, it is desirable that the solution is adjusted to a pH of 1.5 to 3.8 and subjected to a heat treatment at 50° to 130° C. for up to 60 minutes, preferably, when the temperature being higher than 110° C., for 1 minute or less. The pH of the solution can be adjusted by using the above acid or an alkali such as sodium hydroxide, sodium carbonate, etc.

After the heat treatment, if necessary, the gluten solution is cooled, and then the solution is neutralized by an alkali such as that described in the above at 60° C. or lower.

The resulting neutralized solution per se can be used as the high solubility gluten product of the present invention. Alternatively, the neutralized solution can be further treated to use as the high solubility gluten product of the present invention. For example, it can be concentrated or it can be powdered by a standard method such as freeze drying, spray drying, etc. The resulting gluten product of the present invention shows excellent solubility in water and warm water even at a neutral pH range and, upon heating at 70° C. or higher, it shows heat gelation properties which is characteristic of gluten.

Like soy bean protein, the gluten product having high solubility obtained by the process of the present invention is very useful as main or supplementary raw materials of various food products. In addition, like milk and soy milk, the gluten product of the present invention can be used for a drink such as, in a sense, gluten milk.

As the representative examples of albumin and globulin used in the process of the present invention, lactalbumin and ovalbumin were chosen and their effects on the solubility of gluten were tested as follows.

(1) Effect of Amount of the Protein Added

A gluten solution (concentration of powdered gluten: about 10%) was prepared by adding 5 N hydrochloric acid (1 ml) to water (100 ml), adding powdered gluten (10 g) and a predetermined amount of α-lactalbumin or ovalbumin to the resulting solution to dissolve them therein, and adjusting the pH of the solution to 3.0 with 1 N hydrochloric acid and 1 N sodium hydroxide. The solution was heated to either 80° C., in case of addition of α-lactalbumin, or 70° C., in case of addition of ovalbumin, and then it was cooled to room temperature, immediately. The cooled solution was neutralized to pH 6.5±0.2 with 5 N sodium hydroxide.

The neutralized solution (10 ml) was transferred into a 10 ml graduated test tube and allowed to stand for 24 hours in a refrigerator. After 24 hours, the degree of syneresis was determined based on the amount of supernatant present in the test tube. That is, for exmaple, when 3 ml of supernatant was observed in the test tube, the degree of syneresis was expressed as 30%.

Further, aggregation of the remaining neutralized solution (90 ml) was observed with eye, immediately after neutralization and evaluated according to the following criteria:

+: aggregation was observed;
±: slight aggregation was observed; and
—: no aggregation was observed.

The results of the measurement of syneresis are shown in FIG. 1. In FIG. 1, the ordinate axis represents the degree of syneresis (%) and the abscissa axis represents the ratio (%) of each albumin to gluten. The symbol ○ is corresponding to addition of α-lactalbumin and the symbol ● is corresponding to addition of ovalbumin.

The results of the evaluation of aggregation are as shown in Table 1.

TABLE 1

| Ratio of albumin | Aggregation | |
| to gluten (%) | α-Lactalbumin | Ovalbumin |
| --- | --- | --- |
| No addition | + | + |
| 1 | + | + |

TABLE 1-continued

| Ratio of albumin | Aggregation | |
| to gluten (%) | α-Lactalbumin | Ovalbumin |
| --- | --- | --- |
| 3 | ± | + |
| 5 | — | + |
| 10 | — | ± |
| 20 | — | — |
| 30 | — | ± |
| 40 | — | + |
| 50 | — | + |
| 75 | + | + |
| 100 | + | + |

As is seen from FIG. 1 and Table 1, when the ratio of α-lactalbumin to gluten is 3 to 50%, or the ratio of ovalbumin to gluten is 10 to 30%, solubility of gluten is improved.

(2) Effect of pH in the heat treatment

According to the same procedure as in the above test (1), various gluten solutions (concentration of powdered gluten: 10%, the ratio of albumin to gluten: 20%) having different pH's were prepared. Each solution was heated at 80° C. (in case of α-lactalbumin) or at 70° C. (in case of ovalbumin), and then immediately cooled to room temperature. After cooling, the measurement of the degree of syneresis and the observation of aggregation were performed according to the same procedure as in the above test (1). As a control, the same procedure was repeated by using a solution containing no albumin.

Figure 2:
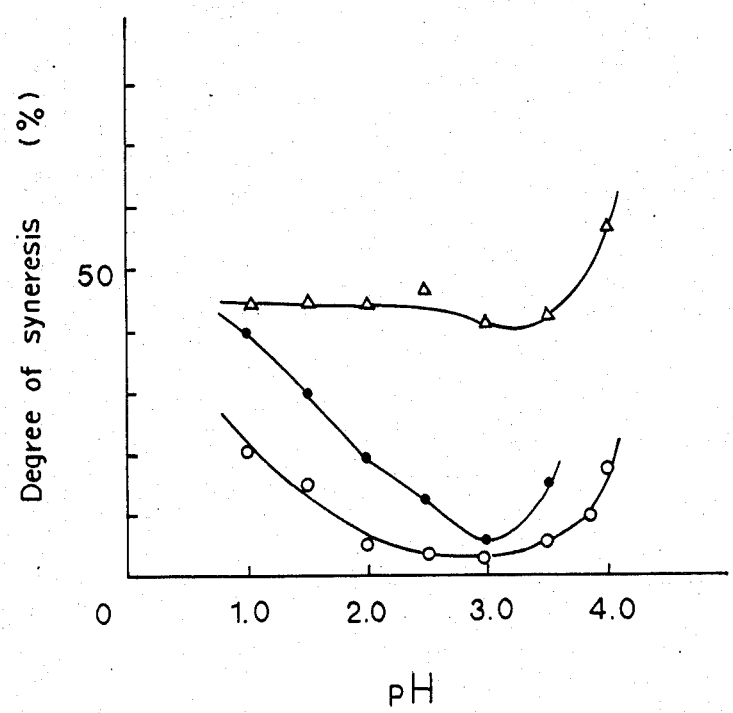
FIG. 2 is a graph illustrating a relation between a pH at which the heating is performed and a degree of syneresis.

The results of the measurement of the degree of syneresis are shown in FIG. 2. In FIG. 2, the ordinate axis represents the degree (%) of syneresis and the abscissa axis represents pH. The symbol ○ is corresponding to addition of α-lactalbumin, the symbol ● is corresponding to addition of ovalbumin and the symbol △ is corresponding to without addition of albumin.

The results of observation of aggregation are shown in Table 2.

TABLE 2

| | Aggregation | | |
| pH | α-Lactalbumin | Ovalbumin | Without albumin |
| --- | --- | --- | --- |
| 1.0 | + | + | + |
| 1.5 | ± | + | + |
| 2.0 | — | + | + |
| 2.5 | — | ± | + |
| 3.0 | — | — | + |
| 3.5 | — | ± | + |
| 3.8 | ± | + | + |
| 4.0 | + | + | + |

As is seen from FIG. 2 and Table 2, solubility of gluten is improved at pH of 1.5 to 3.8 in case of addition of α-lactalbumin or pH 2.5 to 3.5 in case of addition of ovalbumin.

(3) Effect of heat temperature

According to the same procedure as in the above test (1), various gluten solutions (concentration of powdered gluten: 10%, ratio of albumin to gluten: 20%, pH: 3.0) were prepared. Each solution was heated at a different temperature and then immediately cooled. After cooling, the measurement of the degree of syneresis and the observation of aggregation were performed according to the same procedure as in the above test (1). As a control, the same procedure was repeated by using a solution containing no albumin. By the way, heating at 90° C. or higher was performed for 2 seconds by using a plate type heat exchanger.

Figure 3:
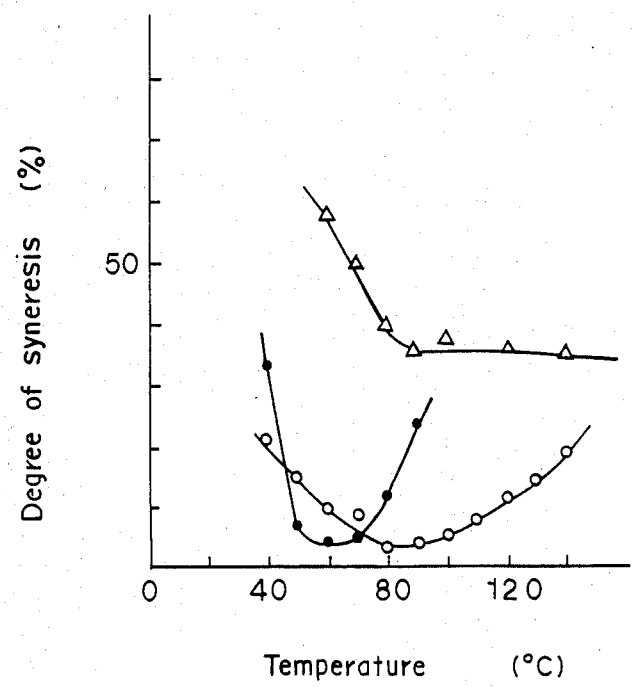
FIG. 3 is a graph illustrating a relation between a heating temperature and a degree of syneresis.

The results of the measurement of the degree of syneresis are shown in FIG. 3. In FIG. 3, the ordinate axis represents the degree (%) of syneresis and the abscissa axis represents the heat temperature (° C.). The symbol ○ is corresponding to addition of α-lactalbumin, the symbol ● is corresponding to addition of ovalbumin and the symbol Δ is corresponding to without addition of albumin.

The results of the observation of aggregation are shown in Table 3.

TABLE 3

| Temp. | Aggregation | | |
|---|---|---|---|
| (°C.) | α-Lactalbumin | Ovalbumin | Without albumin |
| 40 | + | + | + |
| 50 | ± | ± | + |
| 60 | − | − | + |
| 70 | − | − | + |
| 80 | − | ± | + |
| 90 | − | + | + |
| 100 | − | + | + |
| 110 | − | + | + |
| 120 | ± | + | + |
| 130 | ± | + | + |
| 140 | + | + | + |

As is seen from FIG. 3 and Table 3, solubility of gluten is improved by heating at 50° to 130° C. in case of addition of α-lactalbumin or at 50° to 80° C. in case of addition of ovalbumin.

(4) Effect of heating time

Gluten solutions as used in the above test (3) were treated by heating at various temperatures for various periods of time and the measurement of the degree of syneresis and the observation of aggregation were performed according to the same procedure as described above. By the way, heating at 100° C. or higher was performed by using an autoclave.

The results are shown in Table 4.

TABLE 4

| Albumin | Heating temp. (°C.) | Heating time (min.) | Degree of syneresis (%) | Aggregation |
|---|---|---|---|---|
| Ovalbumin | 50 | without* holding | 15 | ± |
| | | 15 | 15 | ± |
| | | 30 | 15 | ± |
| | | 60 | 15 | ± |
| | 60 | without* holding | 5 | − |
| | | 15 | 5 | − |
| | | 30 | 5 | − |
| | | 60 | 5 | − |
| | 70 | without* holding | 5 | − |
| | | 5 | 7 | − |
| | | 15 | 12 | ± |
| | | 30 | Gelled | + |
| | 80 | without* holding | 13 | ± |
| | | 5 | 14 | ± |
| | | 15 | 13 | ± |
| | | 30 | Gelled | ± |
| α-Lactalbumin | 60 | without* holding | 10 | ± |
| | | 15 | 12 | ± |
| | | 30 | 12 | ± |
| | | 60 | 13 | ± |
| | 80 | without* holding | 3 | − |
| | | 15 | 5 | − |
| | | 30 | 6 | − |
| | | 60 | 6 | − |
| | 90 | without* holding | 4 | − |
| | | 15 | 4 | − |
| | | 30 | 4 | − |
| | | 60 | 4 | − |
| | 100 | without* holding | 5 | − |
| | | 15 | 5 | − |
| | | 30 | 7 | − |
| | | 60 | 12 | − |
| | 110 | without* holding | 8 | − |
| | | 1 | 12 | ± |
| | | 2 | 15 | + |
| | | 5 | 32 | + |
| | 120 | without* holding | 12 | ± |
| | | 1 | 15 | + |
| | | 2 | 17 | + |
| | | 5 | 31 | + |
| | 130 | without* holding | 14 | ± |
| | | 1 | 25 | + |

*After reached to the predetermined temperature, the cooling was immediately started.

As shown in Table 4, the heating time is preferably up to 30 minutes, more preferably, up to 15 minutes in case of using ovalbumin or up to 60 minutes in case of using α-lactalbumin, particualrly, up to 1 minute when heating is performed at 110° C. or higher.

By the way, in these test, serum albumin, β-lactoglobulin and serum globulin show similar tendencies to that of α-lactalbumin; and myogen, lysozyme and myosin show similar tendencies to that of ovalbumin.

The following examples and reference examples further illustrate the present invention in detail but are not to be construed to limit the scope thereof.

EXAMPLE 1

A solution (2.5 liters) containing 19% of solids concentration and 14.3% of protein was prepared by ultrafiltration of unripened cheese whey (50 liters, pH: 4.5, solids concentration: 6.5%, protein: 0.75%) according to diafiltration method (protein composition of this solution was 30% of α-lactalbumin, 50% of β-lactoglobulin and 20% of other protein). To the solution was added water (12.5 liters) to bring the total volume to 15 liters and the solution was divided into two equal portions (solutions A and B). Only the solution B was denaturated by heating at 90° C. for 15 minutes.

To each of the solutions A and B was added 12 N hydrochloric acid (35 ml) and powdered gluten (1 kg, protein content: 80%) was added with stirring. The pH of resulting each solution was 3.1.

Each solution was heated to 80° C. and then immediately cooled to 40° C. with external cooling. To the solution was added 10 N sodium hydroxide (44 ml) with stirring to neutralize the solution.

In the solution A in which gluten had been dissolved and the heat treatment had been performed, no aggregation was observed even after neutralization and gluten was almost completely dissolved. The resulting product was spray-dried according to a known method to obtain the desired powdered gluten product having excellent solubility. The powdered gluten product showed good solubility in warm water at 50° C. and no precipitation was observed even after standing for 3 hours.

On the other hand, during neutralization of the solution B in which gluten had been dissolved and the heat treatment had been performed, aggregation was initiated at pH about 4 and, as pH rises, the aggregate became larger and it could not be dissolved even with vigorous stirring.

EXAMPLE 2

To water (500 ml) was added 5 N hydrochloric acid and powdered gluten (50 g) was dissolved therein. To the resulting solution was added powdered α-lactalbumin (2.5 g, without denaturation, protein content: 75%) was added to obtain a solution of pH 2.0.

The solution was heated at 60° C. for 30 minutes and then cooled to 50° C. The solution was neutralized with 10 N sodium hydroxide to pH 6.2.

After neutralization, the solution was freeze dried to obtain the desired powdered gluten product (47 g) having improved solubility. When the powdered product (20 g) thus obtained was added to warm water (100 ml) and stirred, it was dissolved homogeneously. No precipitation was observed even after standing for 2 hours. Then, upon heating the solution to 80° C., it formed a characteristic gel of gluten.

EXAMPLE 3

To hydrous gluten prepared from wheat flour of a high gluten content (200 g, water content: 65%) was added 0.05 N hydrochloric acid (1 liter) and powdered egg white (10 g) was dissolved therein to obtain a solution of pH 3.2. The resulting solution was heated at 60° C. for 3 minutes and then cooled to 30° C. It was neutralized with 5 N sodium hydroxide to pH 6.0 to obtain the desired liquid gluten product having improved solubility. This product did not show any aggregation during neutralization and form precipitation even after standing for 5 hours.

EXAMPLE 4

To warm water (30 liters) at 50° C. was added conc. hydrochloric acid (110 ml) and powdered plasma (1.6 kg, protein content: 70%, solids concentration: 93%, protein composition: albumin/globulin=6/4) was dissolved therein. Then, powdered gluten (4 kg) was added and dissolved with stirring to obtain a solution of pH 3.4. The resulting solution was heated at 120° C. for 2 seconds with a plate type heat exchanger and then cooled to 40° C., immediately. After cooling, it was neutralized with 10 N sodium hydroxide. During and after neutralization, no aggregation of gluten was observed.

The neutralized solution thus obtained was spray-dried according to a standard method to obtain the desired powdered product (2.8 kg). When the powdered product (50 g) was added to warm water (500 ml) and stirred, the product was readily dissolved and no precipitation was observed even after standing for 3 hours.

REFERENCE EXAMPLE 1

To water (200 ml) was added 5 N hydrochloric acid (15 ml) and powdered gluten (10 g) and α-lactalbumin powder (2 g) were dissolved therein to obtain a solution of pH 1.3. The resulting solution was heated to 80° C. When the solution was reached to 80° C., it was cooled to 40° C., immediately. After cooling, the solution was neutralized with slowly adding 5 N sodium hydroxide, aggregation was initiated at pH of beyond about 4 and, even neutralization up to pH 6.2 was performed with stirring, the aggregate of gluten could not be dissolved. When stirring was ceased, the aggregate of gluten was precipitated.

REFERENCE EXAMPLE 2

To water (200 ml) was added 1 N hydrochloric acid and powdered lactalbumin (0.2 g) was dissolved therein. Then, powdered gluten (20 g) was dissolved to obtain a solution of pH 3.0. The solution was heated to 80° C. and held at this temperature for 5 minutes. Then, the solution was cooled to 30° C. and neutralized with 1 N sodium hydroxide which resulted in aggregation of gluten.

What is claimed is:

1. A process for producing gluten having high solubility which comprises heating an aqueous acidic solution of gluten and one or more proteins selected from the group consisting of lysozyme albumins, and globulins in an amount of one half or less by weight of that of gluten under acidic conditions and then, after cooling, neutralizing the solution.

2. A process according to claim 1, wherein the acidic solution contains one or plurality of proteins selected from the group consisting of α-lactalbumin, serum albumin, β-lactoglobulin and serum globulin in an amount of 3 to 50 parts by weight per 100 parts by weight of gluten, and the solution is treated by heating at pH of 1.5 to 3.8 at 50° to 130° C. and neutralized at 60° C. or lower.

3. A process according to claim 1, wherein the acidic solution contains one or plurality of proteins selected from the group consisting of α-lactalbumin, ovalbumin, serum albumin, myogen, β-lactoglobulin, serum globulin, lysozyme and myosin in an amount of 10 to 30 parts by weight per 100 parts by weight of gluten, and the solution is treated by heating at pH of 2.5 to 3.5 at 50° to 80° C. and neutralized at 60° C. or lower.

4. A process according to claim 1, wherein the acidic solution contains gluten in an amount of up to about 40% by weight based on the weight of the solution.

* * * * *